United States Patent

Hamahira et al.

[11] Patent Number: 5,307,620
[45] Date of Patent: May 3, 1994

[54] FUEL GAS BURNING CONTROL METHOD

[75] Inventors: Sumio Hamahira, Kobe; Yoshikazu Maki, Munakata, both of Japan

[73] Assignee: Kawasaki Jukogyo Kabushiki Kaisha, Hyogo, Japan

[21] Appl. No.: 864,799

[22] Filed: Apr. 7, 1992

[30] Foreign Application Priority Data

Apr. 9, 1991 [JP] Japan ................. 3-32234[U]

[51] Int. Cl.⁵ .............................................. F02G 3/00
[52] U.S. Cl. ....................... 60/39.06; 60/39.091; 431/16; 431/22
[58] Field of Search ............. 60/39.06, 39.091, 39.465, 60/734, 223; 431/16, 22

[56] References Cited

U.S. PATENT DOCUMENTS

| | | | |
|---|---|---|---|
| 3,008,516 | 11/1961 | Weiss | 60/39.091 |
| 4,142,851 | 3/1979 | Handa | 431/16 |
| 4,455,821 | 6/1984 | Janik et al. | 60/39.091 |
| 4,984,424 | 1/1991 | Shekleton | 60/734 |

FOREIGN PATENT DOCUMENTS

| | | | |
|---|---|---|---|
| 0034638 | 9/1981 | European Pat. Off. | 431/22 |
| 0110824 | 8/1980 | Japan | 431/22 |
| 0140035 | 11/1980 | Japan | 431/22 |
| 0197733 | 11/1984 | Japan | 431/22 |
| 0147215 | 6/1989 | Japan | 431/22 |
| 0219416 | 9/1989 | Japan | 431/22 |
| 0878991 | 11/1981 | U.S.S.R. | 60/39.091 |
| 1068667 | 1/1984 | U.S.S.R. | 431/22 |

Primary Examiner—Richard A. Bertsch
Assistant Examiner—Howard R. Richman
Attorney, Agent, or Firm—Oliff & Berridge

[57] ABSTRACT

A method of safely controlling a burning of a fuel gas in a combustor in response to the pressure change in a fuel gas sealed in a fuel gas passage between a fuel gas supply source and the combustor communicated with the fuel gas supply source, the method comprising the steps of sealing a fuel gas in the fuel gas passage before supply to the combustor prior to the start of the operation of the combustor, detecting a pressure change in the fuel gas sealed in the fuel gas passage, controlling the supply of the fuel gas to the combustor in response to a signal representing the detected pressure change, and interrupting start of operation of the combustor when a pressure change in the sealed fuel gas is detected prior to the start of the operation of the combustor. Abnormal burning such as an explosion due to fuel gas leakage is prevented.

4 Claims, 2 Drawing Sheets

FUEL GAS BURNING CONTROL METHOD

BACKGROUND OF THE INVENTION

The present invention relates to a method for safely controlling burning of a fuel gas utilized for a gas turbine, for example.

Generally, when it is required to start the operation of a combustor of a gas turbine system for burning a fuel gas, a pre-purge operation of the residual fuel gas is first preliminarily carried out and then an actual burning is performed in the combustor. It is also recommended to arrange various safety devices to a control unit for the combustor.

In one typical example of a gas turbine system provided with such a fuel gas burning control unit, a combustor has an inlet portion which communicates with a main fuel passage connected to a fuel gas resource through which the fuel gas flows. Safety shut off valves, called safety valves hereinafter, a main shut-off valve and a flow regulating valve are incorporated in the main fuel passage in this order towards the combustor. A pressure detection switch and a control unit operatively connected to the pressure detection switch are also incorporated in the main fuel passage in order to detect the pressure of the fuel gas. A branch fuel passage is connected at one end to the main fuel passage at a portion just before the main shut-off valve and has the other end connected to the inlet portion of the combustor. A primary shut-off valve and a throttle means are incorporated in the branch fuel passage. The operations of these valves are controlled by an engine control box which is operatively connected to a starter motor.

In such a gas turbine system, after the start of operation the, a pressure of the fuel gas to be supplied to the combustor is measured by the pressure detection switch. In a case where the detected pressure value is outside of a controllable range, an alarm signal is transmitted from the control unit to the engine control box, and then the engine control box generates a signal to the safety shut-off valves and the main shut-off valve to close these valves and thereby stop the supply of the fuel gas to the combustor. A gas turbine system of the type described above is only equipped with such a control unit. Accordingly, at the time of operation start, i.e. ignition, of the combustor, if part of the fuel gas leaks through the main shut-off valve due to foreign particles for example attached to the valve sheets thereof, and enters into the combustor, there is the fear of causing abnormal burning, such as an explosion in an extreme case, resulting in breakage of the combustor itself, as well as ducts connected to the combustor.

SUMMARY OF THE INVENTION

An object of the present invention is to substantially eliminate defects or drawbacks encountered in the prior art and to provide a method for controlling burning of a fuel gas in a gas turbine system, for example, capable of preventing abnormal burning of a combustor by interrupting the start of the operation of the combustor prior to its start by detecting the fuel gas leakage from a sealed portion in a fuel gas supply passage.

This and other objects can be achieved according to the present invention by providing a method of controlling the burning of a fuel gas in a combustor in response to a pressure of the fuel gas sealed in a fuel gas passage between a fuel gas supply source and the combustor means communicated with the fuel gas supply source, wherein a fuel gas is sealed in the fuel gas passage before the supply of the fuel gas to the combustor prior to the start of its operation, a pressure of the fuel gas sealed in the fuel gas passage is detected by a pressure detection switch, the supply of the fuel gas to the combustor is controlled in response to a signal from the pressure detection switch, and the start of the operation of the combustor is interrupted in response to a pressure change of the sealed fuel gas detected by the pressure detection switch prior to the start of the operation of the combustor.

According to the present invention as characters described above, the fuel gas leakage from the main shut-off valve and the primary shut-off valve is detected by the pressure detection switch in the pre-purge stage of the combustor. When the leakage is detected, the fuel gas supply to the combustor is completely shut off and start of the operation of the combustor is interlocked by the control unit operatively connected to the pressure detection switch, whereby abnormal burning such as explosions caused by fuel gas leakage, for example from the main shut-off valve, can be effectively prevented.

BRIEF DESCRIPTION OF THE DRAWINGS

In the accompanying drawings.

DESCRIPTION OF THE PREFERRED EMBODIMENT

The preferred embodiment of the present invention will be described hereunder in conjunction with FIGS. 1 and 2.

Figure 1:
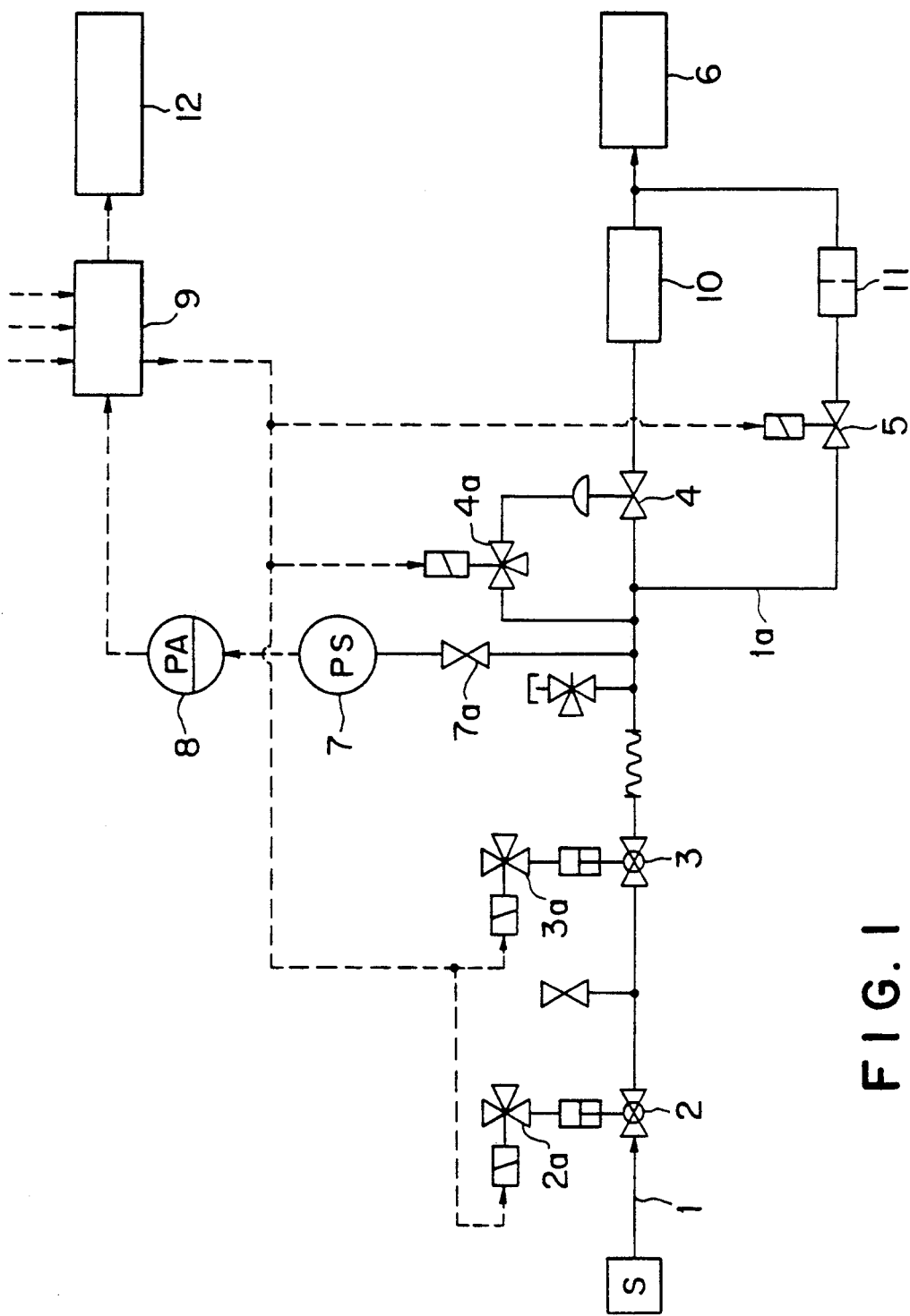
FIG. 1 is a block diagram showing a fuel gas burning control system for a gas turbine utilizing a method of the present invention.

First, referring to FIG. 1 showing a gas turbine system of a general structure provided with a fuel gas burning control unit, a combustor 6 has an inlet portion with which is communicated a main fuel passage 1 through which the fuel gas passes from a fuel gas supply source S. Shut-off valves 2, 3 operated by automatic valves 2a, 3a for safety, called safety valves hereinafter, a main shut-off valve 4 operated by an automatic valve 4a and supplying the fuel gas, and a flow regulating valve 10 are incorporated in series in this order in the main fuel passage 1 towards the combustor 6. A pressure detection switch 7 is also incorporated into the main fuel passage 1 and a control unit 8 is operatively connected through a root valve 7a to the pressure detection switch 7. A branch fuel passage 1a is connected at one end to the main fuel passage 1 at a portion just before the main shut-off valve 4 and connected at the other end to the inlet portion of the combustor 6. A primary shut-off valve 5 and a throttle means 11 are incorporated into the branch fuel passage 1a so as to initially supply the gas fuel to the combustor 6. The operations of these valves and other means are operatively connected to an engine control box 9 to be controlled thereby and to be connected to other control means, thus constituting a control system of the combustor 6.

In such a gas turbine system, prior to the start of the operation, the safety valves 2 and 3 are first opened thereby supplying the fuel gas into the main fuel passage 1. In this process, since the main shut-off valve 4 and the primary shut-off valve 5 are initially closed, the fuel gas fills into the passage portions of the main passage 1 and the branch passage 1a between the downward safety valve 3 and the main shut-off valve 4 and the primary shut-off valve 5. In this state, the safety valves 2 and 3 are then closed to seal the fuel gas between the passage portions described above.

The pressure of this sealed fuel gas is measured for every predetermined time interval by the pressure which detects the switch 7 for detecting pressure change of fuel gas in the passage portions of main passage 1 to detect whether or not the fuel gas pressure is lowered, that is whether, the fuel gas leaks from the main shut-off valve 4 and the primary shut-off valve 5. The timing of such operations is performed in response to timing signals in a pre-purge process which is generally carried out. As described above, to the pressure detection switch 7 is connected a control unit 8 which transmits a signal regarding the fuel gas pressure change detected by the pressure detection switch 7 to the engine control box 9. In the analysis of the signal, in a case where it is determined that the detected fuel gas pressure is below a preset lower limit value, the control unit 8 generates an alarm signal which is transmitted to the engine control box 9 to indicate that the fuel gas pressure is lowered, that is, that fuel gas is leaking from the main shut-off valve 4 and the primary shut-off valve 5. Upon receiving this signal, the engine control box 9 generates a command signal to close the respective shut-off valves 2, 3, 4 and 5 and maintain the closed states thereof, and at the same time, also generates a signal to release the operation instructions, whereby the control system of the gas turbine is instructed so as not to operate the combustor 6.

Accordingly, when the control unit 8 connected to the pressure detection switch 7 detects a lowering of the gas pressure of the fuel gas sealed in the closed passage portions, showing fuel gas leakage therefrom, before the pre-purge process, the combustor 6 is not subjected to the pre-purge, thus being capable of preventing the combustor 6 from causing an abnormal burning therein. Furthermore, the engine control box 9 is also provided with a control unit which generates a signal to stop the operation of the combustor 6 upon detecting the fuel gas pressure change in the main fuel passage 1 after the start of the operation of the gas turbine system.

Figure 2:
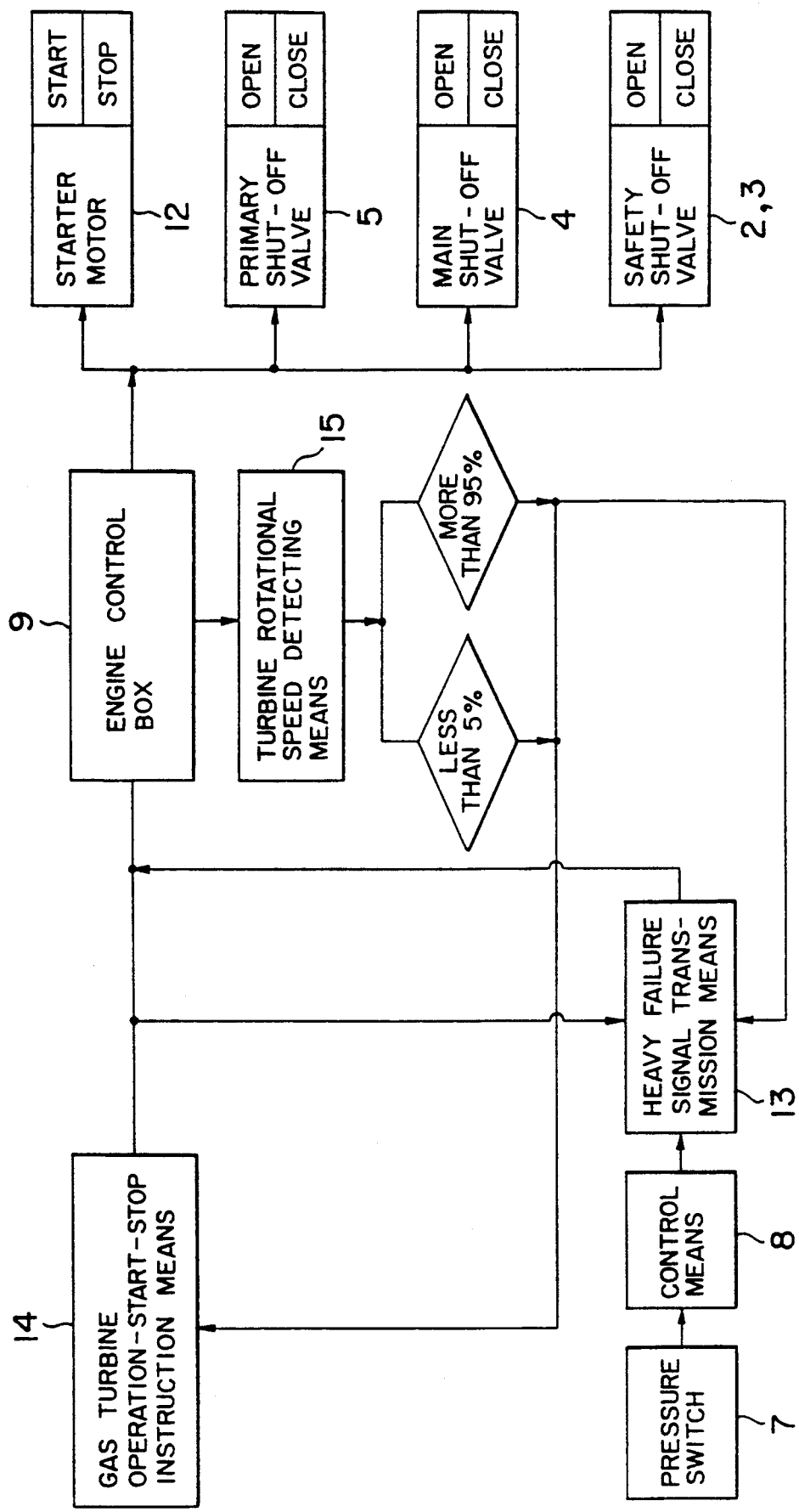
FIG. 2 is a block diagram of a control system according to the present invention in association with the system shown in FIG. 1.

Referring to FIG. 2 showing the signal input-output relation in the control system according to the present invention, to the engine control box 9 are connected: a signal input system, which is connected to a heavy failure signal transmitting means 13, for inputting a signal from a gas turbine operation-start-stop instruction means 14; a signal output system for controlling the operation-start-stop instructions of a starter motor 12 connected to the engine control box 9 and the open-close operation of the main shut-off valve 4, the primary shut-off valves 5 and the safety valves 2 and 3, in response to signals from the above mentioned signal input system; and another signal output system for feeding back the rotation speed signal, detected by turbine rotational speed detecting means 15, representing the rotation speed of the gas turbine to the gas turbine operation-start-stop instruction means 14. In a case where less than 15% of the turbine rotational speed is detected, a signal is generated to stop the start of the gas turbine operation-start-stop instruction means 14 while in a case where more than 95% of the turbine rotational speed is detected, another signal is generated to start a generator so as to generate an exciting current.

According to the control system represented by FIG. 2, in the pre-purge stage as a process prior to the turbine operation start, the safety shut-off valves 2 and 3 for safeness, which are closed in this stage in the conventional arrangement, are opened and thereafter closed to seal the fuel gas in the main fuel passage 1 in which the pressure detection switch 7 is incorporated. The pressure of the sealed fuel gas is detected by the pressure detection switch 7 and the information of this pressure detection is transferred to the control unit 8, from which a signal representing the change of the fuel gas pressure is transmitted in order to the heavy failure signal transmission means 13 and the engine control box 9. Upon receiving this signal, the engine control box 9 generates a command signal to close the respective shut-off valves 2, 3, 4 and 5 and maintain the closed state. At the sam time, the operational command instructions of the gas turbine operation-start-stop instruction means 14 is released thereby stopping the operation of the combustor 6, thus performing the interruption of the control system.

Furthermore, according to the preferred embodiment of the present invention, at a time when the pressure change of the fuel gas sealed in the main fuel passage 1 is detected after the start of the operation of the gas turbine, the safety shut-off valves 2 and 3 and the main shut-off valve 4 are closed by the command signal transmitted from the engine control box 9 in response to the heavy failure signal from the control unit 8.

As described above, according to the present embodiment, in the pre-purge stage before the start of the operation of the combustor of the gas turbine system, fuel gas leakage from the primary shut-off valve and the main shut-off valve is detected and the leakage is transmitted to the engine control box by means of signals representing the fuel gas pressure change, and upon receiving the signals, the engine control box operates the control system for interrupting or stopping the operation of the combustor. Accordingly, abnormal burning such as an explosion in an extreme case in the combustor caused by the fuel gas leakage can be effectively prevented, thus also preventing the combustor and ducts associated therewith from being accidentally destroyed.

What is claimed is:

1. A method of safely controlling the burning of a fuel gas in a combustion means in response to a pressure change in a fuel gas sealed in a main fuel gas passage between a fuel gas supply source and the combustion means, said method comprising the steps of:

sealing a fuel gas in the main fuel gas passage before supplying the fuel gas to the combustion means prior to the start of the operation of the combustion means, wherein said sealing is carried out by the steps of:

closing a main shut-off valve incorporated in said main fuel gas passage and a primary shut-off valve incorporated in a branch fuel gas passage, said branch fuel gas passage being connected at one end to said main fuel gas passage at a portion upstream of said main shut-off valve and connected at another end to an inlet portion of said combustion means;

opening safety shut-off valves incorporated in series in said main fuel gas passage;

supplying the fuel gas into said main fuel gas passage; and closing said safety shut-off valves, thereby sealing the fuel gas in said main fuel gas passage and said branch fuel gas passage;

detecting a pressure change in the fuel gas sealed in the main fuel gas passage;

controlling the supply of the fuel gas to the combustion means in response to a signal representing the detected pressure change; and interrupting the start of the operation of the combustion means when a pressure change in the sealed fuel gas is detected prior to the start of the operation of the combustion means.

2. The method according to claim 1, wherein said pressure change in the fuel gas sealed in said main fuel gas passage is detected by a pressure detection means incorporated in said main fuel gas passage.

3. A method of safely controlling the burning of a fuel gas in a combustion means in response to a pressure change in a fuel gas sealed in a main fuel gas passage between a fuel gas supply source and the combustion means, said method comprising the steps of:

sealing a fuel gas in the main fuel gas passage before supplying the fuel gas to the combustion means prior to the start of the operation of the combustion means, wherein said sealing is carried out by the steps of:

closing a main shut-off valve incorporated in said main fuel gas passage and a primary shut-off valve incorporated in a branch fuel gas passage, said branch fuel gas passage being connected at one end to said main fuel gas passage at a portion upstream of said main shut-off valve and connected at another end to an inlet portion of said combustion means;

opening safety shut-off valves incorporated in series in said main fuel gas passage;

supplying the fuel gas into said main fuel gas passage; and closing said safety shut-off valves, thereby sealing the fuel gas in said main fuel gas passage and said branch fuel gas passage;

detecting a pressure change in the fuel gas sealed in the main fuel gas passage, wherein said pressure change in the fuel gas sealed in said main fuel gas passage is detected by a pressure detection means connected to said main fuel gas passage;

controlling the supply of the fuel gas to the combustion means in response to a signal representing the detected pressure change, wherein said controlling is carried out by the steps of:

inputting a value representing said pressure change to a control means that is operatively connected to said pressure detection means and which generates a signal representing said pressure change; and transmitting said signal to an engine control box connected to said control means and operated in response to said signal, thereby controlling the supply of the fuel gas to said combustion means; and interrupting the start of the operation of the combustion means when a pressure change in the sealed fuel gas is detected prior to the start of the operation of the combustion means.

4. A method of safely controlling the burning of a fuel gas in a combustion means in response to a pressure change in a fuel gas sealed in a main fuel gas passage between a fuel gas supply source and the combustion means, said method comprising the steps of:

sealing a fuel gas in the main fuel gas passage before supplying the fuel gas to the combustion means prior to the start of the operation of the combustion means, wherein said sealing is carried out by the steps of:

closing a main shut-off valve incorporated in said main fuel gas passage and a primary shut-off valve incorporated in a branch fuel gas passage, said branch fuel gas passage being connected at one end to said main fuel gas passage at a portion upstream of said main shut-off valve and connected at another end to an inlet portion of said combustion means;

opening safety shut-off valves incorporated in series in said main fuel gas passage;

supplying the fuel gas into said main fuel gas passage; and closing said safety shut-off valves, thereby sealing the fuel gas in said main fuel gas passage and said branch fuel gas passage;

detecting a pressure change in the fuel gas sealed in the main fuel gas passage, wherein said pressure change in the fuel gas sealed in said main fuel gas passage is detected by a pressure detection means connected to said main fuel gas passage;

controlling the supply of the fuel gas to the combustion means in response to a signal representing the detected pressure change, wherein said controlling is carried out by the steps of:

inputting a value representing said pressure change to a control means that is operatively connected to said pressure detection means and which generates a signal representing said pressure change; and transmitting said signal to an engine control box connected to said control means and operated in response to said signal, thereby controlling the supply of the fuel gas to said combustion means; and interrupting the start of the operation of the combustion means when a pressure change in the sealed fuel gas is detected prior to the start of the operation of the combustion means, wherein said interrupting is carried out by the steps of:

generating by means of said engine control box a command signal to close said safety shut-off valves, main shut-off valve and primary shut-off valve; and releasing command instructions of a gas turbine operation-start-stop instruction means operatively connected to said engine control box to stop the operation of said combustion means, thereby interrupting the start of the operation of said combustion means.

* * * * *